(12) United States Patent
Dumas et al.

(10) Patent No.: US 10,385,721 B2
(45) Date of Patent: Aug. 20, 2019

(54) SYSTEM FOR CONTROLLING VARIABLE PITCH BLADES FOR A TURBINE ENGINE

(71) Applicant: SAFRAN AIRCRAFT ENGINES, Paris (FR)

(72) Inventors: Lilian Yann Dumas, Moissy-Cramayel (FR); Kamel Benderradji, Moissy-Cramayel (FR); Alain Marc Lucien Bromann, Moissy-Cramayel (FR); Suzanne Madeleine Coustillas, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 209 days.

(21) Appl. No.: 15/542,919

(22) PCT Filed: Jan. 13, 2016

(86) PCT No.: PCT/FR2016/050049
§ 371 (c)(1),
(2) Date: Jul. 11, 2017

(87) PCT Pub. No.: WO2016/116682
PCT Pub. Date: Jul. 28, 2016

(65) Prior Publication Data
US 2018/0010478 A1    Jan. 11, 2018

(30) Foreign Application Priority Data

Jan. 19, 2015 (FR) .................................. 15 50395

(51) Int. Cl.
*F01D 17/16*    (2006.01)
(52) U.S. Cl.
CPC ...... *F01D 17/162* (2013.01); *F05D 2220/323* (2013.01); *F05D 2240/128* (2013.01); *F05D 2260/50* (2013.01); *Y02T 50/671* (2013.01)

(58) Field of Classification Search
CPC ... F01D 5/022; F01D 5/06; F01D 7/02; F01D 9/042; F01D 17/10; F01D 17/12;
(Continued)

(56) References Cited

U.S. PATENT DOCUMENTS 3,066,488 A    12/1962  Mock
3,861,822 A *  1/1975  Wanger ................. F01D 17/162
                                                            415/147

(Continued)

FOREIGN PATENT DOCUMENTS

WO    WO-2008147023 A2    12/2008

OTHER PUBLICATIONS

International Search Report with English Translation dated Mar. 18, 2016, PCT Application No. PCT/FR2016/050049.

*Primary Examiner* — Igor Kershteyn
(74) *Attorney, Agent, or Firm* — Womble Bond Dickinson (US) LLP

(57) ABSTRACT

The invention relates to a system for controlling variable pitch blades for a turbine engine, comprising an annular row of variable pitch blades extending about an axis (A) and each comprising a blade connected at the radially outer end thereof to a pivot (20) that defines a substantially radial axis of rotation of the blade and which is connected by a lever (34) to control means (40a, 40b) extending about said axis. The invention is characterized in that said control means include first links (40a) supported by said pivots and second links (40b) extending between said first links, said first and second links extending substantially along a same circumference of said axis and being connected to one another and to actuation means (56).

11 Claims, 2 Drawing Sheets

(58) Field of Classification Search
CPC .. F01D 17/14; F01D 17/162; F05D 2220/323; F05D 2240/128; F05D 2260/50; Y02T 50/671
See application file for complete search history.

(56) References Cited

U.S. PATENT DOCUMENTS

| | | | | |
|---|---|---|---|---|
| 4,253,797 | A * | 3/1981 | Weiler | F04D 27/0215 415/160 |
| 4,295,784 | A * | 10/1981 | Manning | F01D 17/20 415/162 |
| 5,044,879 | A * | 9/1991 | Farrar | F01D 17/162 415/150 |
| 5,993,152 | A * | 11/1999 | Schilling | F01D 17/162 415/155 |
| 7,037,070 | B2 * | 5/2006 | Raine | F01D 17/162 415/149.4 |
| 8,591,173 | B2 * | 11/2013 | Bouru | F01D 17/16 415/149.4 |
| 2013/0039735 | A1 * | 2/2013 | Eifert | F01D 17/162 415/1 |
| 2013/0210572 | A1 * | 8/2013 | Coles | F01D 17/20 475/331 |

* cited by examiner

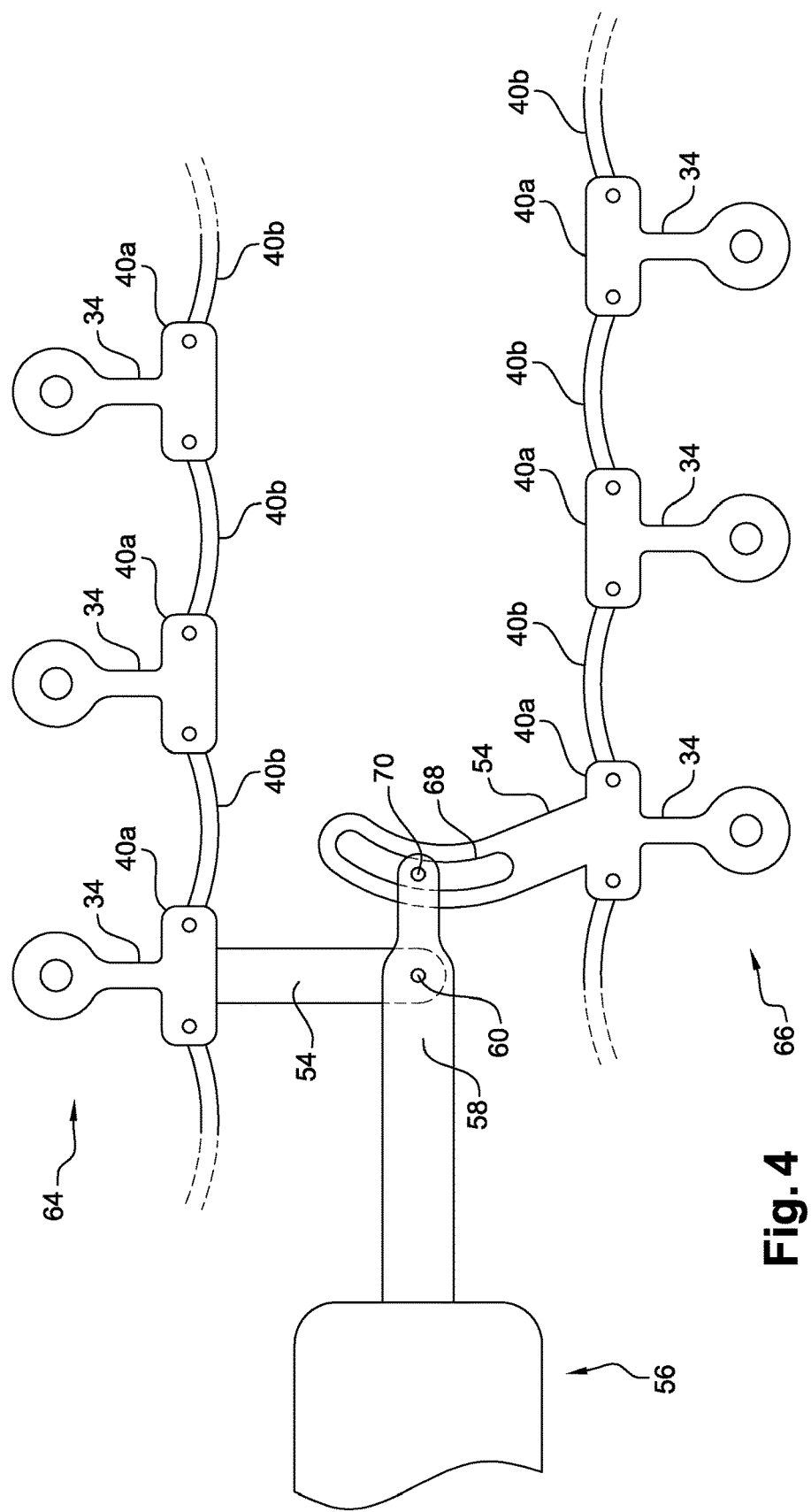

SYSTEM FOR CONTROLLING VARIABLE PITCH BLADES FOR A TURBINE ENGINE

TECHNICAL FIELD

The present invention relates to a system for controlling variable-pitch vanes for a turbine engine.

PRIOR ART

The prior art includes in particular WO-A2-2008/147023 and U.S. Pat. No. 3,066,488.

The variable-pitch stator vanes (also referred to as VSV, which is an abbreviation for variable stator vanes) of a turbine engine are carried by an outer annular casing, generally of a compressor of the turbine engine. Each vane comprises a blade, the radially outer end of which is connected, via a plate having a substantially circular contour, to a cylindrical radial pivot which defines the axis of rotation of the vane and which is rotated in a corresponding opening of the outer casing. The radially inner end of the blade of each vane generally comprises a second cylindrical pivot which extends along the axis of rotation of the vane and is rotated in an opening in an inner casing of the compressor.

The radially outer end of the outer pivot of each vane is connected by a lever to a control ring which is rotated about the outer casing by cylinder actuation means or similar. The rotation of the control ring is transmitted by the connecting rods to the outer pivots of the vanes and causes said vanes to turn about the axes thereof.

The angular pitch of the stator vanes in a turbine engine is intended to adapt the geometry of the compressor to the operating point thereof, and in particular to optimise the efficiency and the surge margin of said turbine engine, and to reduce the fuel consumption thereof in the different flight configurations.

Each of these vanes can be rotated about the axis thereof between a first "open" or "fully open" position, in which each vane extends substantially in parallel with the longitudinal axis of the turbine engine, and a second "closed" or "almost closed" position, in which the vanes are inclined with respect to the axis of the turbine engine and thus reduce the air-flow cross section through the vane stage.

The control ring must be centred and guided in rotation about the axis of rotation thereof. In the current art, the outer casing comprises tracks on which the inner periphery of the ring can interact frictionally. The casing comprises members, such as pads, for bearing and guiding on the tracks. The pads are used, firstly, to ensure the concentricity of the ring around the casing by adjusting pad/casing clearances and, secondly, to limit the deformation of the ring caused by the aerodynamic forces on the variable-pitch vanes which are exerted on the kinematics during operation.

The present invention proposes an improvement to this prior technology which is simple, effective and economical.

SUMMARY OF THE INVENTION

The invention proposes a control system for variable-pitch vanes for a turbine engine, comprising at least one annular row of variable-pitch vanes extending around an axis and each comprising a blade which is connected at the radially outer end thereof to a pivot which defines a substantially radial axis of rotation of the vane and which is connected by a lever to control means extending around said axis, characterised in that said control means comprise first links carried by said pivots and second links extending between said first links, said first and second links extending substantially over the same circumference around said axis and being connected to one another and to actuation means.

The control ring from the prior art is thus replaced with means which are similar to a chain and comprise a series of links. First links are carried by the levers connected to the pivots of the vanes, and second links extend between the first links and are connected thereto. The assembly is connected to actuation means, such as an actuator. The rotation of the control means is initiated by the actuation means, and the movement is transmitted from a first link to another first link adjacent thereto by the second link extending between said first links. The second links can thus be used to synchronise the movements of the first links and thus the rotations of the vanes about the axes of the pivots thereof. This technology makes it possible to do away with the guiding pads from the prior art and thus to simplify the system and to reduce the mass, the cost and the adjustments during assembly thereof.

In fact, with respect to a ring system, the invention makes it possible to save on adjustment by eliminating the differential expansions between firstly the vanes and the outer casing thereof and secondly the ring. In operation, the links and the levers have expansion behaviour which is very close to that of the vanes and of the associated outer casing, which is beneficial for reducing the forces in the control system.

The system according to the invention may include one or more of the following features, taken in isolation from one another or in comparison with one another:
the number of the first links is equal to the number of the second links, which is equal to the number of levers (or vanes);
said first links are formed in one piece with said levers;
each of the first and/or second links has an elongate shape and is connected by the longitudinal ends thereof to other links;
the first links are connected by pivot and/or swivel connections to the second links;
the second links each have a general curved shape, preferably in a plane which is substantially tangent to a circumference which is centred on said axis;
the first links are female links, and the second links are male links;
each lever has a general elongate shape and comprises a first longitudinal end for connection to the pivot of a vane and a second longitudinal end carrying one of said first links;
at least one of the levers comprises a longitudinal extension for connection to said actuation means;
said longitudinal extension comprises a through hole or slot for guiding in a sliding manner one element of said actuation means; and
said actuation means are connected to two annular rows of variable-pitch vanes.

The present invention also relates to a turbine engine, characterised in that it comprises at least one system as described above.

DESCRIPTION OF THE DRAWINGS

The invention will be better understood, and other details, features and advantages of the invention will become clearer upon reading the following description, given by way of non-limiting example with reference to the accompanying drawings, in which:

FIG. 4 is a very schematic view of a variant of the control system for variable-pitch vanes according to the invention.

DETAILED DESCRIPTION

Figure 1:
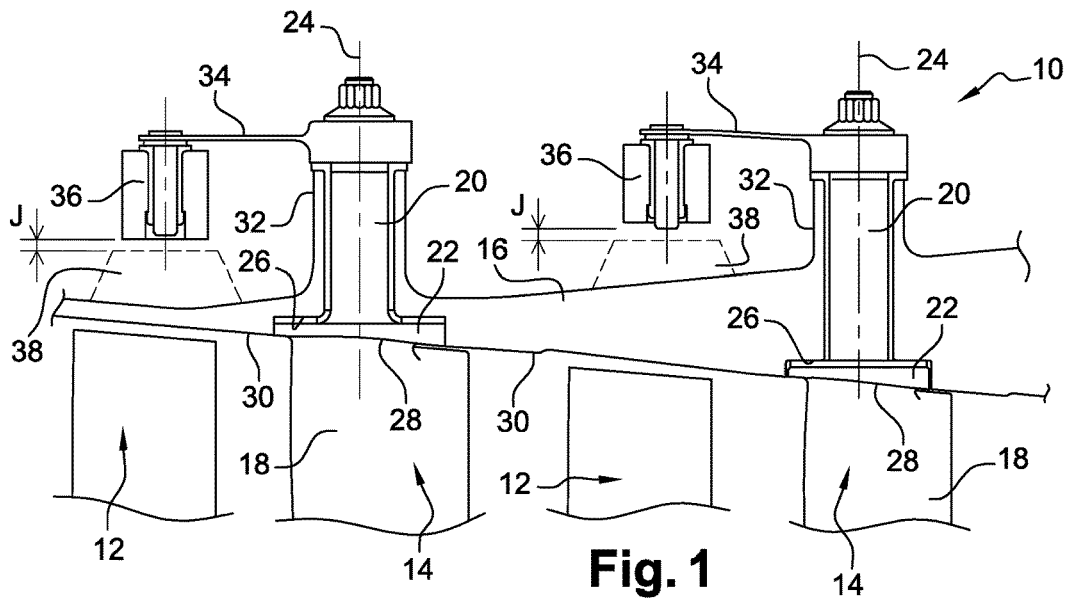
FIG. 1 is a schematic partial half view in axial section of variable-pitch vane stages for a turbine engine.

FIG. 1 shows schematically, in axial section, a portion of a high-pressure compressor 10 of a turbine engine, in particular of an aircraft turbine engine, having a plurality of stages, each stage comprising an annular row of movable vanes 12 carried by the rotor (not shown) of the turbine engine, and an annular row of fixed vanes 14 which form guide vane assemblies carried by a casing 16 of the stator of the turbine engine, it being possible to regulate the angular orientation of the vanes 14 in order to optimise the gas flow in the compressor 10.

Each vane 14 comprises a blade 18 and a radially outer cylindrical pivot 20 which are connected via a disc or "plate" 22 extending perpendicularly to the axis 24 of the vane in a corresponding compartment 26 of the casing 16. The radially inner surface 28 of the disc is aligned with the inner wall 30 of the casing so as not to oppose the gas flow.

In the prior art, the cylindrical pivot 20 of each vane 14 extends inside a radial cylindrical stack 32 of the casing 16, and the radially outer end thereof is connected via a lever 34 to a control ring 36 which surrounds the casing 16 and is associated with actuation means (not shown), making it possible to turn said pivot in either direction about the longitudinal axis of the casing 16 so as to cause the vanes 14 of an annular row to rotate about the axes 24 thereof.

The vanes 14 can be rotated about the axes 24 thereof between a fully closed position and a fully open position.

In the fully closed position, the blades 18 of the vanes are inclined relative to the longitudinal axis of the turbine engine and a minimum air-flow cross section in the duct is defined between said blades. The vanes 14 are brought into this position when the turbine engine is operating at low speed or at idle speed, the flow rate of air flowing in the compressor thus having a minimum value.

In the fully open position, the blades 18 of the vanes extend substantially in parallel with the axis of the turbine engine, in such a way that the air-flow cross section between the blades is at a maximum. The vanes 14 are brought into this position when the turbine engine is operating full throttle, the flow rate of air flowing in the compressor thus having a maximum value.

In the prior art, the casing 16 comprises, at the outer periphery thereof, projecting tracks 38 for centring and guiding the rings 36, which tracks are shown schematically here by dashed lines. Each ring 36 surrounds the guiding track or tracks 38 thereof. The reference sign J denotes the radial clearances which are provided cold between a ring 36 and the track or tracks 38 thereof. Said clearances J must be sufficiently large to allow thermal expansions of the casing 16 but do not make it possible to precisely adjust the angular positions of the vanes 14. Said clearances J are adjusted by means of wedges during assembly of the control system.

The invention makes it possible in particular to simplify this technology by replacing the control ring with a series of links.

Figure 2:
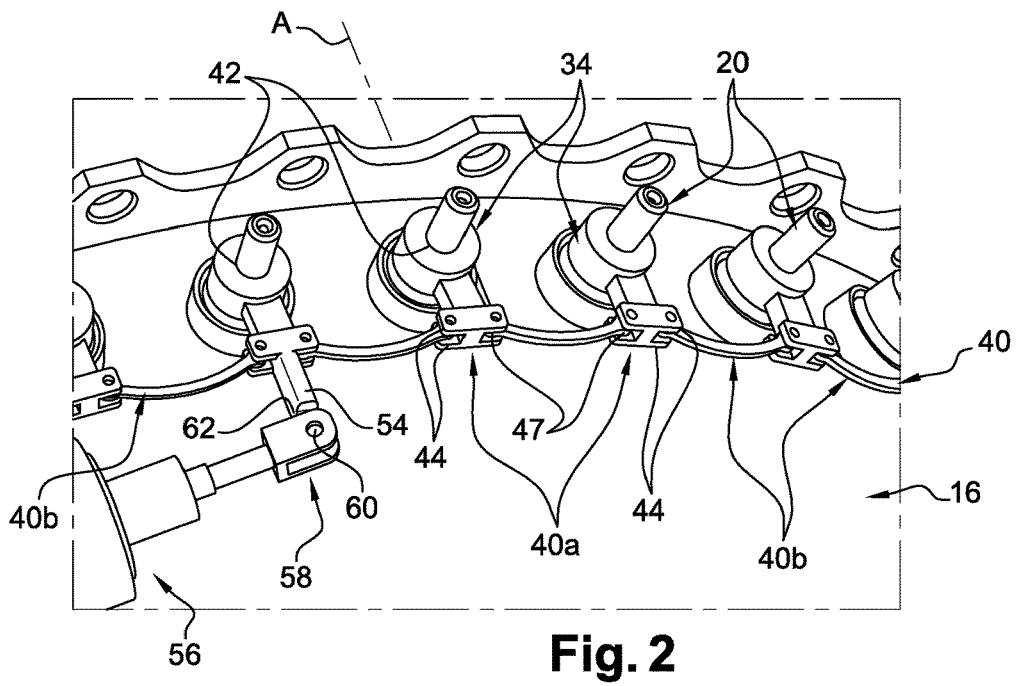
FIG. 2 is a schematic partial perspective view of a control system for variable-pitch vanes for a turbine engine according to the invention.

FIG. 2 shows an embodiment of the invention.

The control means 40 comprise a series of links 40a, 40b which extend over the same circumference around the longitudinal axis A of the casing 16 and which are arranged substantially end-to-end and interconnected. The control means 40 comprise first links 40a carried by the levers 34 and second links 40b extending between the first links 40a.

Each lever 34 has an elongate shape and comprises a first longitudinal end connected to the pivot 20 of a vane and a second longitudinal end connected to a first link 40a. The first end of each lever 34 in this case comprises an opening 42 through which the pivot 20 of the vane passes. The lever 34 is configured to be connected to the vane for conjoint rotation therewith and can comprise, in the region of the opening 42 thereof, a flat portion or a similar means which is intended to interact with the pivot 20 to achieve this result. As can be seen in FIG. 1, a nut could be screwed onto a threaded portion of the pivot 20 of the vane to ensure the lever 34 is held opposite said pivot.

In the example shown, the second end of each lever 34 is formed in one piece with a first link 40a.

Each first link 40a has an elongate shape, the axis of elongation of which is substantially perpendicular to that of the corresponding lever 34. Each first link 40a in this case is of the female type and comprises at each of the longitudinal ends thereof means for connection, and in particular for articulation, to the second links 40b adjacent thereto. Each of the longitudinal ends of the first link 40a forms a clevis of the female type, comprising two lugs 44 which are in parallel with and at a distance from one another, said lugs 44 comprising assembly openings having a substantially radial axis 46 of articulation of a second link 40b.

Each second link 40b has a shape which is elongate and, in this case, slightly curved. Each second link 40b is curved in a plane which is substantially tangent to a circumference centred on the axis A. As can be seen in FIG. 2, the concavities of the second links 40b are all oriented in the same longitudinal direction.

Each second link 40b in this case is of the male type and comprises at each of the longitudinal ends thereof means for connection, and in particular for articulation, to the first links 40a adjacent thereto. Each of the longitudinal ends of the second link 40b forms a clevis of the male type, comprising a lug 47 comprising an opening through which the above-mentioned axis 46 passes.

Figure 3:
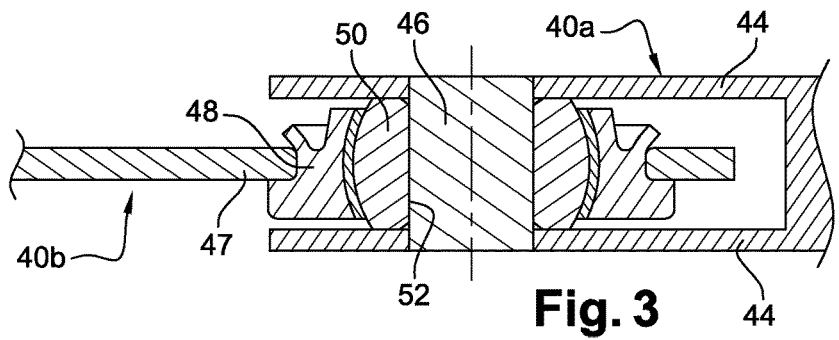
FIG. 3 is a schematic enlarged view of a connection between two links of the control means of the system according to the invention.

Preferably, and as shown in FIG. 3, the first and second links 40a, 40b are interconnected by swivel connections. Each swivel connection comprises an outer ring 48 which is engaged and crimped in the opening of the lug 47 of the second link 40b and which comprises a spherical inner compartment, inside which compartment a head 50, which is a part-sphere, is mounted in a swivelling manner. The head 50 comprises a cylindrical compartment 52 through which a finger forming the axis 46 passes, and the longitudinal ends of which are respectively fixed to the lugs 44 of the first link 40a. The finger forming the axis 46 is preferably mounted in the compartment 52 to form a sliding pivot.

At least one of the levers 34 has a longitudinal dimension which is greater than that of the other levers and comprises, on the side of the above-mentioned second longitudinal end thereof, a longitudinal extension 54 for connection to actuation means, and more particularly to the piston rod 58 of an actuator 56 in the example shown. Said longitudinal extension 54 is connected by the free end thereof to the actuator rod 58.

The actuator body 56 in this case has a female actuator rod 58 comprising two lugs which are in parallel with and at a distance from one another, said lugs 44 comprising assembly openings having an axle pin 60. The free end of the extension 54 of the lever forms a male clevis 62 comprising a lug comprising an opening through which the axle pin 60 passes. A swivel connection, of the type of that shown in FIG. 3, can be used to connect the clevis 62 to the rod 58.

When the levers 34 and the links are assembled, the adjustments are simplified as a result of the absence of pads. The vanes and the levers thereof are positioned angularly, and the links are connected whilst verifying the angular positions in the vane stages, whilst verifying for various angular positions that the sides of the links match the desired results. Such verifications are known in principle, but in this case, because of the links, there are no pads to select and adjustment operations are thus avoided.

In operation, the actuator 56 actuates the piston rod 58 thereof, and this causes a displacement of the lever 34 and a rotation of the corresponding vane 14 about the axis 24 of the pivot 20 thereof. This rotational movement is transmitted to the adjacent levers 34 and to the other levers 34 by means of the links 40*a*, 40*b* which thus synchronise the displacements of the levers and the vanes 14. In operation, the expansions of the vanes and of the associated outer casing induce little force in the levers and links, the expansion behaviour of which matches well that of said casings and vanes by a good transmission of the expansions, whilst preserving the desired precision. The effects of inertia in expansion of some control ring systems from the prior art are avoided, which is beneficial for minimising the transmissions of forces in the control system and beneficial for preserving the precision in a uniform manner even during transient phases of expansion.

The control system according to the invention can comprise between two and four distinct actuation means (actuators). The system thus comprises between two and four levers each equipped with an extension 54.

In the variant shown schematically in FIG. 4, the actuation means is/are connected to two stages or annular rows of variable-pitch vanes, which are upstream 64 and downstream 66 respectively.

The upstream annular row 64 of variable-pitch vanes is substantially identical to that described above, with reference to FIGS. 2 and 3.

The downstream annular row 66 of variable-pitch vanes is similar to the upstream annular row 64. The above description relating to FIGS. 2 and 3 thus applies to said row 66 insofar as it does not contradict what follows.

The levers 34 of the downstream row 66 extend towards the upstream row 64. Furthermore, the concavities of the second links 40*b* are all oriented in the same longitudinal direction, which is the opposite of that of the second links of the upstream row 64.

At least one of the levers 34 of the downstream row 66 has a longitudinal dimension which is greater than that of the other levers and comprises, on the side of the longitudinal end thereof opposite the vane, a longitudinal extension 54 for connection to the actuation means, and more particularly to the piston rod 58 of the actuator 56 in the above-mentioned example. Said longitudinal extension 54 comprises a through slot or hole 68 in which an axle pin 70 carried by the actuator rod 58 is mounted in a sliding manner.

The body of the actuator 56 in this case has a female actuator rod 58 comprising two lugs which are in parallel with and at a distance from one another, said lugs comprising openings for mounting a first axle pin 60 for connection to the extension 54 of the lever 34 of the upstream row 64 and a second axle pin 70 for connection to the extension of the lever 34 of the downstream row 66.

In operation, the or each actuator 56 actuates the piston rod 58 thereof, and this causes a displacement of the levers 34 of the two rows 64, 66 and a rotation of the vanes connected to said levers about the axes of the pivots thereof. The hole 68 makes it possible to transmit a desired angular pitch to the vanes of the row 66, which is different from that of the vanes of the row 64. The rotational movements are transmitted to the adjacent levers 34 and to the other levers 34 of the two rows 64, 66 by means of the links 40*a*, 40*b* which thus synchronise the displacements of the levers and the vanes 14.

The invention claimed is:

1. A control system for variable-pitch vanes for a turbine engine, comprising at least one annular row of variable-pitch vanes extending around an axis and each comprising a blade which is connected at the radially outer end thereof to a pivot which defines a substantially radial axis of rotation of the vane and which is connected by a lever to control means extending around said axis, wherein said control means comprise first links carried by said pivots and second links extending between said first links, said first and second links extending substantially over the same circumference around said axis and being connected to one another and to actuation means.

2. The control system according to claim 1, wherein the number of the first links is equal to the number of the second links, which is equal to the number of levers.

3. The control system according to claim 1, wherein said first links are formed in one piece with said levers.

4. The control system according to claim 1, wherein each of the first and/or second links has an elongate shape and is connected by the longitudinal ends thereof to other links.

5. The control system according to claim 1, wherein the first links are connected by pivot and/or swivel connections to the second links.

6. The control system according to claim 1, wherein the second links each have a general curved shape.

7. The control system according to claim 1, wherein the first links (40*a*) are female links, and the second links are male links.

8. System according to claim 1, wherein each lever has a general elongate shape and comprises a first longitudinal end for connection to the pivot of a vane and a second longitudinal end carrying one of said first links.

9. The control system according to claim 8, wherein at least one of the levers comprises a longitudinal extension for connection to said actuation means.

10. The control system according to claim 1, wherein said actuation means are connected to two annular rows of variable-pitch vanes.

11. The control system according to claim 6, wherein said general curved shape extends in a plane which is substantially tangent to a circumference which is centred on said axis.

* * * * *